United States Patent [19]
Drozt et al.

[11] Patent Number: 5,551,062
[45] Date of Patent: Aug. 27, 1996

[54] METHOD FOR ENHANCING COMMUNICATION ACCESS IN A RADIO COMMUNICATION SYSTEM

[76] Inventors: Peter M. Drozt, 1043 Longford Rd., Bartlett, Ill. 60103; Alexander Rozenstrauch, 1222 Lockwood Dr., Buffalo Grove, Ill. 60089; Bin Lo, 23W060 Mulberry La., Glen Ellyn, Ill. 60137

[21] Appl. No.: 96,146

[22] Filed: Jul. 22, 1993

[51] Int. Cl.$^6$ .................................................. H04B 7/26
[52] U.S. Cl. ..................... 455/54.2; 455/56.1; 455/58.2; 455/34.1
[58] Field of Search ................... 455/33.1, 34.1, 455/54.1, 54.2, 56.1, 58.2; 379/63, 58, 59, 60

[56] References Cited

U.S. PATENT DOCUMENTS

| | | | |
|---|---|---|---|
| 4,723,264 | 2/1988 | Sasata et al. | 379/58 |
| 5,101,502 | 3/1992 | Felderman et al. | 455/34.1 |
| 5,276,911 | 1/1994 | Levine et al. | 455/33.1 |
| 5,301,356 | 4/1994 | Bodiin et al. | 455/34.1 |
| 5,335,353 | 8/1994 | Cizek et al. | 455/58.2 |

FOREIGN PATENT DOCUMENTS

| | | | |
|---|---|---|---|
| 3003583 | 2/1993 | WIPO | 455/58.2 |

*Primary Examiner*—Reinhard J. Eisenzopf
*Assistant Examiner*—Thanh Le
*Attorney, Agent, or Firm*—James A. Coffing

[57] ABSTRACT

A multi-site communication system (100) includes a plurality of communication units (112–117), a central controller (101) for coupling a plurality of communication sites (106–108), and a site controller (103) corresponding to one of the communication sites (106). Communication access between two or more communication units (112–117) can be enhanced by a method (200, 300) including the steps of receiving (201) a request for a first communication, and directing (211) the appropriate site controller to re-submit the request. By so doing, the site controller (103) can request (314) the central controller (101) to establish a realizable communication between two communication units in the system (113, 114).

5 Claims, 3 Drawing Sheets

METHOD FOR ENHANCING COMMUNICATION ACCESS IN A RADIO COMMUNICATION SYSTEM

FIELD OF THE INVENTION

The present invention relates generally to radio communication systems, and more particularly to improving communication access between two or more communication units in such a system.

BACKGROUND OF THE INVENTION

Radio communication systems are well known in the art. Further, such systems that include multiple sites—i.e., so-called multi-site systems—are also well established. In a multi-site radio communication system, a central controller is used to couple each of the communication sites, which in turn are controlled by local site controllers. Communication units—which may be, for example, portable radios, mobile units, or consoles—might be members of different communication groups that are free to roam about their local communication sites. Additionally, members of the same communication group might be permitted to roam among different sites. Unfortunately, the freedom provided by such a system may—under certain conditions, as next described—cause a problem during a request for communication access. The problem—commonly referred to as deadlock—occurs when communication between two or more communication units cannot be established, even though adequate communication resources exist in the system.

To define what is meant by a deadlock condition, consideration is given to the following example. Assuming there is only one communication resource—e.g., radio frequency (RF) channel—available at each of two sites, referred to hereafter as site A and site B. (This may be the result of all other communication resources being used at a particular time, or there may be only one allocated for a particular site.) Upon a service request from a mobile communication unit in site A, the local site controller for site A must reserve the sole available resource. The site controller then sends a request to the central controller to establish communication with an appropriate target communication unit(s) that is presently located in site B. To establish communication with a target unit in site B, the central controller must determine the location—usually using a paging process, or the like—of the target communication unit in site B.

Then, at substantially the same time, another site B communication unit might request service. Similar to the operation at the site A controller, the site B controller reserves the sole resource available for the simultaneously requesting site B unit. The site B controller then sends a request to the central controller to establish communication with an appropriate target unit(s) that is presently located in site A. As before, the central controller locates—e.g., via a page—the target unit in site A.

Since the service request at site A consumes the only remaining resource, but the communication cannot proceed without a resource at site B, the service call is placed in a "wait" state to obtain a resource at site B. Reciprocally, since the service request at site B consumes the only remaining resource at that site, but that communication cannot proceed without a resource at site A, this service call is also placed in a "wait" state until a resource at site A becomes available. Therefore, the two service requests are blocking each other, resulting in a condition referred to in the art as deadlock.

Another type of deadlock condition occurs when a service request from one communication unit requires multiple resources—e.g., multiple communication channels for voice and non-voice communication. For example, assume that a site has one voice channel available, when a service request is received that requires a voice channel and a non-voice (e.g., data) channel. This request is placed in a queue, after reserving the only available voice resource to the requesting unit, until a data channel becomes available. However, before the data channel becomes available, a request is received that requires only a voice channel. This request is also put in the queue—behind the first request—even though the communication could have been established using the previously available, but now reserved, sole voice channel. The foregoing scenario, like the multi-site example given above, creates a condition where a call can not proceed even though adequate resources exist in the system.

One of the more traditional methods of solving the deadlock problem is referred to in the art as deadlock prevention. This solution, however, is very inefficient for multi-site systems, since it requires a large number of messages to be exchanged between sites, thereby consuming valuable communication link bandwidth. Even for a single site system, prevention is still inefficient, since deadlock occurs only rarely, and performing the prevention for each service request consumes valuable CPU cycles. In other words, it would likely be less burdensome to allow a deadlock to occur, and resolve it at such time, than to prevent it for each service request.

Two other, more common, methods of resolving deadlocks are referred to as "busy override", and "ruthless preemption". The former technique—busy override—includes the step of notifying the requester that one or more of the multiple resources required is not available (e.g., a resource at site A is available, but a resource at site B is not). The requester can then either proceed without having communication established with some of the targets, or terminate the service request. The disadvantage of such a technique is the potential lack of communication with all of the target communication units. Further, the burden of having the requester re-issue a previously abandoned service request may result in the operator becoming frustrated.

The latter technique—ruthless preemption—simply terminates a lower priority call in progress, and reallocates the freed resource to the requester. The obvious disadvantage of this technique is the interruption of communication of lower priority. Further, a more complex data base is required to store call priorities for, each of the communication units and/or communication service types.

Accordingly, there exists a need for a radio communication system that enhances communication access between two or more communication units. In particular, a method of resolving a burdensome communication access problem, such as deadlock, without reducing the efficiency of the system would be an improvement over the prior art.

DETAILED DESCRIPTION OF THE PREFERRED EMBODIMENT

Figure 1:
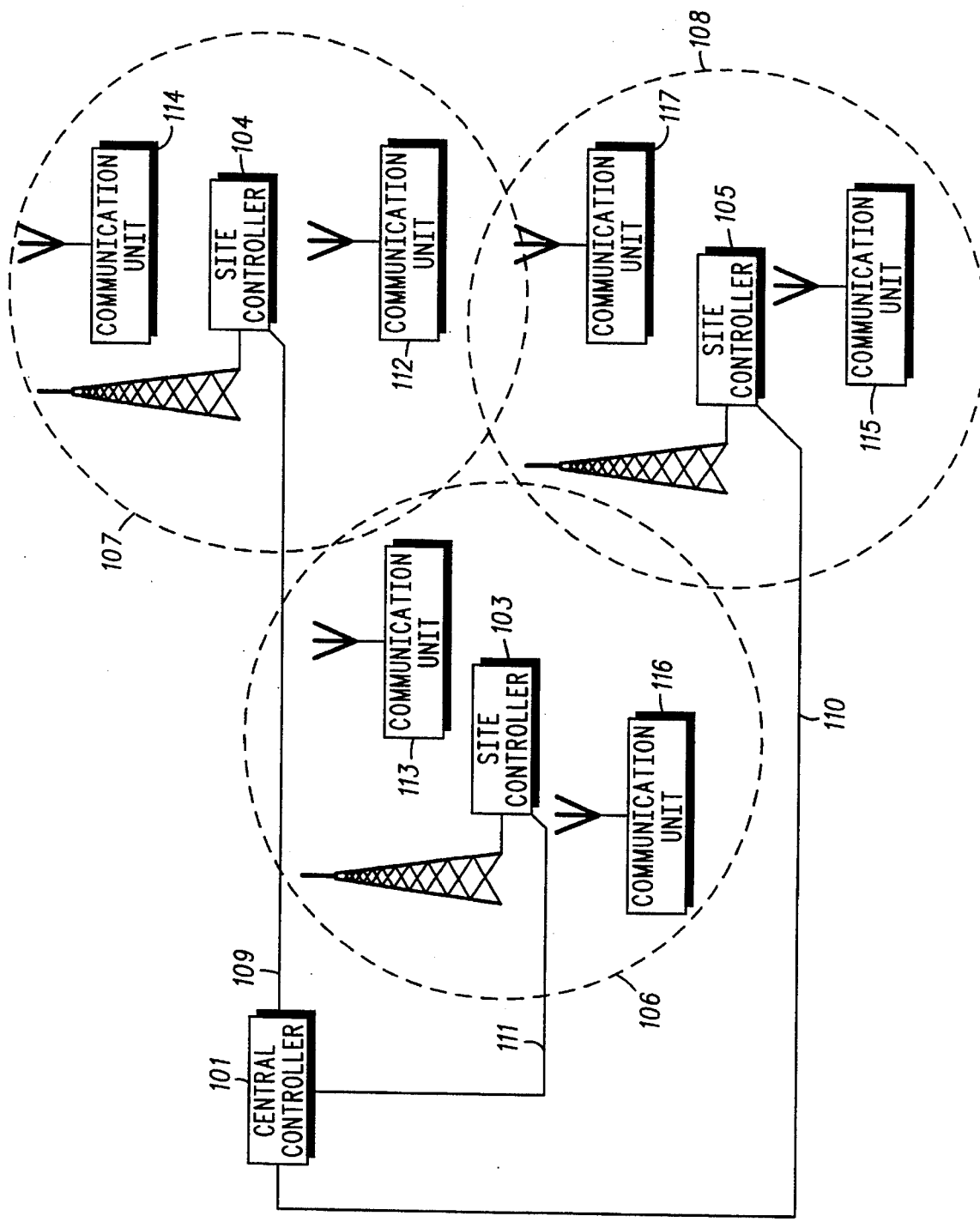
FIG. 1 shows a graphical representation of a radio communication system, in accordance with the present invention.

FIG. 1 shows a multi-site radio communication system (100), including a central controller (101), site controllers (103–105) that provide communication coverage to the communication sites (106–108). Further, communication links (109–111) are used by the central controller (101) to network the communication sites together. Lastly, the communication units (112–117) are located throughout the system and are able to communicate with each other through the site controllers (103–105) and central controller (101).

As described earlier, a deadlock can occur in such a system among the different sites. For example, communication unit 112 in site 107 might request a call to include communication unit 113 in site 106, hereafter referred to as Call A. Similarly, communication unit 116 in site 106 might simultaneously request a call to include communication unit 114 in site 107, hereafter referred to as Call B. When the respective site controllers (103, 104) receive the requests from communication units 116 and 112, respectively, the site controllers (103, 104) first attempt to reserve a communication resource for the respective calls. (It is assumed that each site has only one remaining communication resource available to be assigned to a call—i.e., all other communication resources have been previously assigned to calls in process.) In this case, each site controller (103, 104) reserves the last available communication resource for the requesting communication unit in their site, and then forwards the request to the central controller (101).

When the central controller (101) receives the first request, it must inform the respective target units—e.g., communication unit 113—that a call in which it has been asked to participate—e.g., Call A—is being established. Likewise, the central controller (101) needs to inform communication unit 114 that a call in which it has been asked to participate—e.g., Call B—is being established. These indications will be sent to communication units 113 and 114 via a page message—sent through the respective site controllers (103 and 104). After receiving the page, both communication units 113 and 114 might respond, indicating that they want to participate in their respective calls. When the site controllers (103 and 104) receive these response messages from communication units 113 and 114, each site controller (103, 104) attempts to reserve a communication resource. However, neither site has a communication resource available. Accordingly, the requests for a communication channel are queued in the site controllers (103, 104), and the response messages from communication units 113 and 114 are forwarded to the central controller (101).

It is at this point that a deadlock condition has occurred. That is, for Call A to continue, a communication resource in site 106 must be made available. However, the last communication resource available in site 106 has been reserved for Call B. Likewise, for Call B to continue, a communication resource in site 107 must be made available, but the last resource in site 107 has been reserved for Call A.

As noted earlier, a similar situation might occur within a single site. For example, communication unit 115 in site 108 might request a call that requires multiple communication resources. Assuming that only a limited number of the necessary communication resources can be reserved for the call, two problem situations can arise. The first possibility is that there is a pending request from communication unit 117 that has some communication resources reserved that are required by the call initiated by communication unit 115.

The second possibility is that a request from a communication unit 117 could be blocked if it requires a unique communication resource that is already reserved for the call requested by communication unit 115. That is, a second call is unnecessarily placed in a queue, while a first call waits for a required resource.

In the former case, a deadlock occurs; in the latter case, although a deadlock does not occur, the available communication resources are being inefficiently used, since the communication resource reserved for the call initiated by communication unit 115 could be given to the call requested by communication unit 117.

Figure 2:
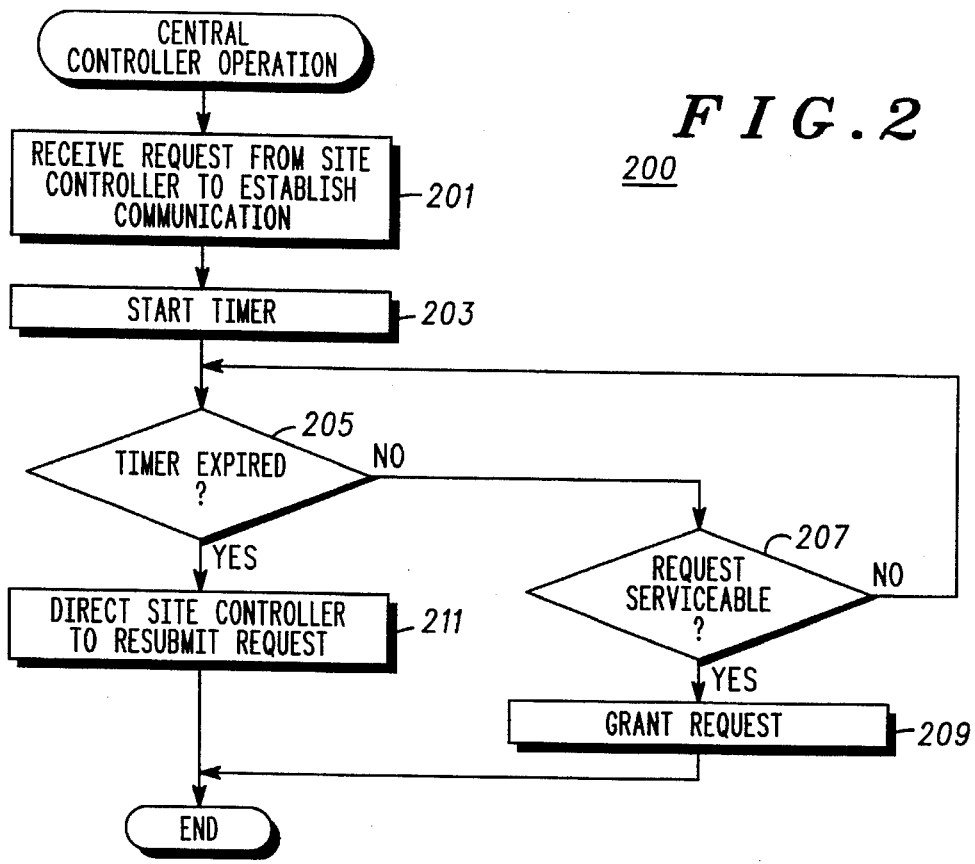
FIG. 2 shows a flow diagram depicting the central controller operation, in accordance with the present invention.

FIG. 2 illustrates the operation of the central controller (101), in accordance with the present invention. The central controller (101) receives (201) a request from the site controller to establish a communication. This request can take any one of three forms: 1) an initial request (e.g., request received from site controller 104 for communication unit 112 to initiate call A); 2) a response to be included in the call (e.g., response received from site controller 103 for communication unit 113 to be included in call A); and 3) an indication from a site controller that it now has a communication channel reserved for a particular call, as later described.

(It should be noted that when the central controller (101) receives the initial requests from communication units 112 and communication unit 116, it must assign a priority to the call. The so-called priority key might be comprised of any number of keys that provide a unique priority for each call being processed. It is well recognized that such a priority might be based on communication group ID, resource type requested, or any other parameter. It is only important that the calls can be distinguished from one another in some manner that, together with the present invention, improves access to the limited communication resources available.)

When the central controller receives a first request, a timer is started (203)—e.g., a so-called watch-dog timer. The primary purpose of the timer is to detect when a deadlock condition exists—i.e., when a call cannot be established. Thus, the expiration of the timer is used to indicate when a call has taken too long to be set-up, indicating a high likelihood that a deadlock condition is present. A decision (205) is then reached to determine whether or not the timer has expired. If so, a deadlock condition is assumed, the requesting site controller is directed (211) to re-submit his request, as later described, and the routine is exited.

On the other hand, if the timer has not expired, a decision (207) is reached to determine whether or not the request is serviceable—i.e., the necessary communication resources have been reserved for the call in the appropriate target sites. Using the earlier example, Call A is considered serviceable when a communication resource is reserved, by both site controllers 103 and 104, for use by communication units 113 and 112, respectively.

Figure 3:
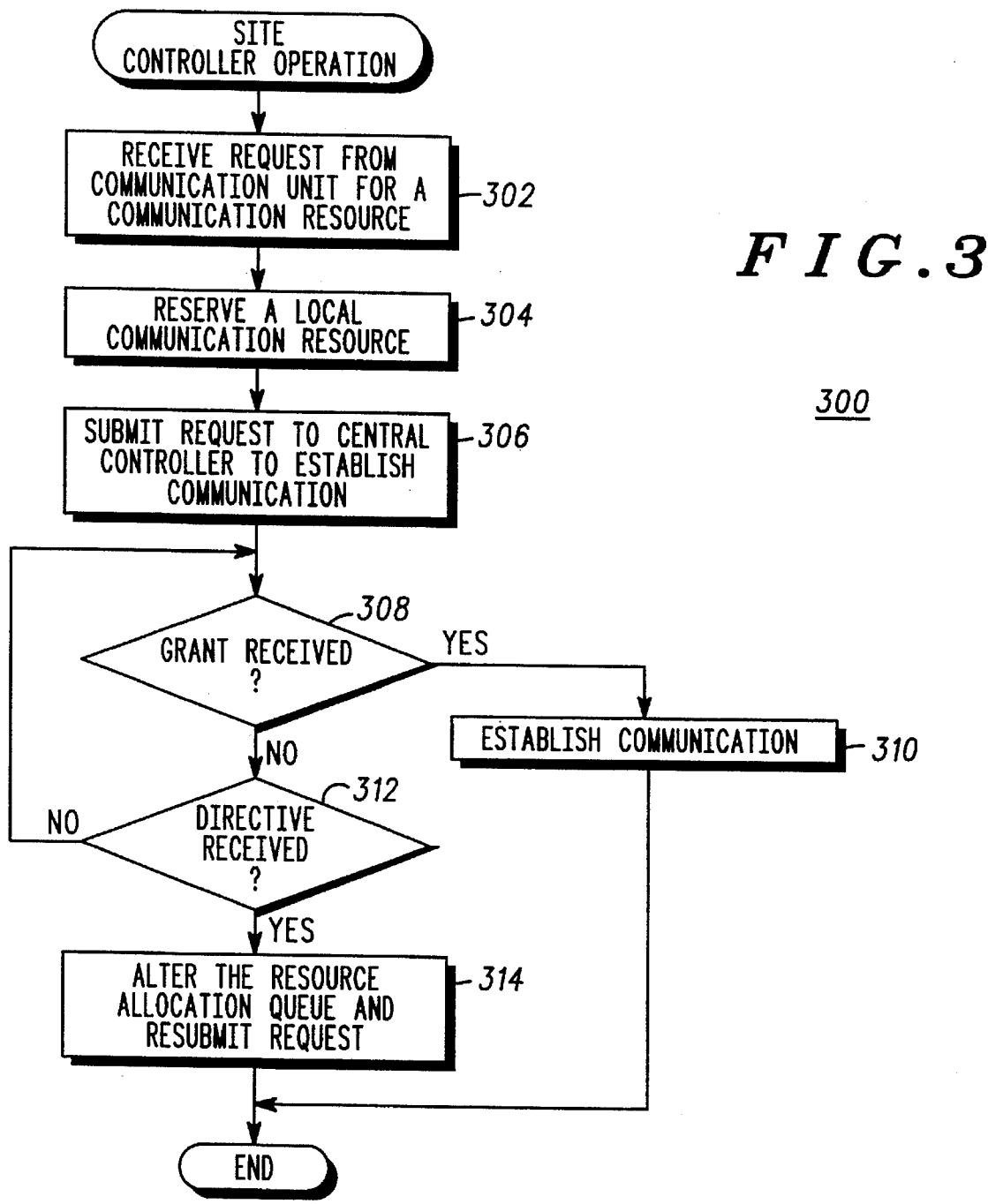
FIG. 3 shows a flow diagram depicting the site controller operation, in accordance with the present invention.

Once the central controller detects that a deadlock has occurred—i.e., upon expiration of the timer—it directs (211) both site controllers (103, 104) to resubmit their respective requests. This directive tells the site controllers, inter alia, to re-assign, if necessary, their communication resources to the best suited calls—i.e., calls that may eventually free the deadlock condition. In particular, this might mean re-assigning a reserved resource to another communication unit, or reserving a different resource type for the same communication unit. In a preferred embodiment, the central controller attempts to resolve the deadlock condition by directing one site controller at a time to re-assign resources. In this manner, the central controller can iteratively arrive at a deadlock resolution, without unnecessarily creating subsequent deadlocks. FIG. 3 shows a flow diagram depicting the operation of the site controllers, in accordance with the present invention. The site controller receives (302) a request, which may be either an initial request for a communication resource, or a page response from a target unit. A local communication resource is then reserved (304), and the request is submitted (306) to the central controller. A decision (308) is then reached to determine whether or not a grant—sent by the central controller upon determination that a call is serviceable—is received. If so, an indication that the call is serviceable, the site controller simply establishes (310) the communication, and the routine is exited.

If the grant has not been received—indicating that the central controller has detected a deadlock—a decision (312) is reached to determine whether or not the directive (transmitted from the central controller in block 211 of FIG. 2) has been received. If the directive has not been received, the routine continues to check for receipt of a grant (308) or the directive (312). Upon receipt of the directive, a resource allocation queue, later described, is altered, and the site controller re-submits a request to establish communication, and the routine is exited. In a preferred embodiment, the set of communication resources not yet being used for calls are re-assigned to other calls that can make better use of them. If any changes are made, the site controller will inform the central control of these changes.

Figure 4:
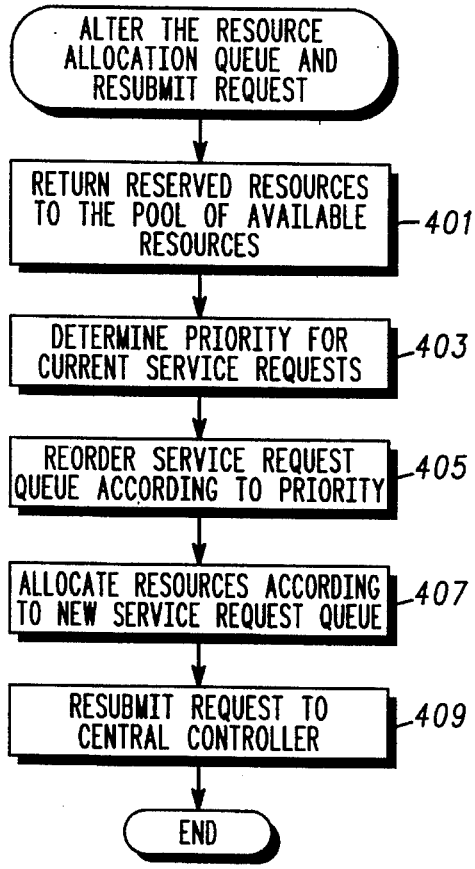
FIG. 4 shows a more detailed flow diagram for one of the functional blocks shown in FIG. 3.

FIG. 4 shows a more detailed description of block 314 shown in FIG. 3. Upon receipt of the directive from the central controller, the communication channels that are currently reserved are returned (401) to the pool of available communication resources. The priority key is then determined (403), and the respective service request queues, or resource allocation queues, are re-ordered (405) according to this priority. That is, each site controller adjusts its call queue so that calls with higher priority are placed on the top of the queue. After this re-ordering, the available communication resources are allocated (407) to the calls according to priority—i.e., those at the top of the queue.

Once a communication resource has been assigned to a call according to the new priority, the central controller must be informed which call now has the communication resource reserved. This is accomplished when the site controller re-submits (409) a request to establish communication—pursuant to its new priority scheme—and the routine is exited. At this point, the central controller is able to establish a communication, since all of the participating sites have resources reserved for the higher priority call. Accordingly, the deadlock condition is resolved, and the communication units are free to request calls without suffering undue processing delays.

With the present invention, the problem of communication resource deadlock, found in prior art systems, is effectively eliminated. Further, resources can be allocated in a systematic manner that gives rise to a more efficient allocation of the limited resources available.

What is claimed is:

1. In a multi-site communication system that includes a plurality of communication units, a central controller for coupling a plurality of communication sites, a plurality of site controllers for controlling communications through each of the plurality of communication sites, a method for resolving a deadlock condition resulting from two or more requests for a common communication resource, the method comprising the steps of:

at the central controller:

A) receiving, from a first site controller, a request for a single available communication resource to establish a first communication between a first communication unit located in a first site and a second communication unit located in a second site;

B) receiving, from a second site controller, a request for the single available communication resource to establish a second communication between a third communication unit located in the second site and a fourth communication unit located in the first site; and C) directing at least the first controller to submit a request for a second communication resource.

2. The method of claim 1, further comprising the step of:

D) at the first site controller, submitting a request for a communication resource required by a communication unit other than the third communication unit.

3. The method of claim 2, wherein step D) comprises the step of:

D1) submitting the request for a communication resource required by a communication unit associated with a communication group other than the communication group associated with the third communication unit.

4. The method of claim 1, further comprising the steps of:

at each of the plurality of site controllers:

D) providing a resource allocation queue for prioritizing first communication resource requests; and E) altering the resource allocation queue when a corresponding communication cannot be established.

5. The method of claim 4, wherein step D) comprises the step of:

D1) prioritizing the resource allocation queue by communication group identity.

* * * * *